US008975360B2

(12) United States Patent
Brunelle et al.

(10) Patent No.: US 8,975,360 B2
(45) Date of Patent: Mar. 10, 2015

(54) POLYCARBONATE NANOCOMPOSITES

(71) Applicants: Daniel J. Brunelle, Burnt Hills, NY (US); Martino Colonna, Bologna (IT); Maurizio Fiorini, Anzola Emilia (BO) (IT); Corrado Berti, Lugo (RA) (IT); Enrico Binassi, Bologna (IT)

(72) Inventors: Daniel J. Brunelle, Burnt Hills, NY (US); Martino Colonna, Bologna (IT); Maurizio Fiorini, Anzola Emilia (BO) (IT); Corrado Berti, Lugo (RA) (IT); Enrico Binassi, Bologna (IT)

(73) Assignee: SABIC Global Technologies B.V., Bergen Op Zoom (NL)

( * ) Notice: Subject to any disclaimer, the term of this patent is extended or adjusted under 35 U.S.C. 154(b) by 0 days.

(21) Appl. No.: 13/941,709

(22) Filed: Jul. 15, 2013

(65) Prior Publication Data

US 2013/0302549 A1 Nov. 14, 2013

Related U.S. Application Data

(63) Continuation of application No. 13/351,102, filed on Jan. 16, 2012, now Pat. No. 8,487,066, which is a continuation of application No. 11/834,458, filed on Aug. 6, 2007, now Pat. No. 8,173,761.

(51) Int. Cl.
| | |
|---|---|
| *C08G 63/02* | (2006.01) |
| *C08G 64/00* | (2006.01) |
| *C08K 9/04* | (2006.01) |
| *B82Y 30/00* | (2011.01) |
| *C08J 5/00* | (2006.01) |
| *C08K 3/34* | (2006.01) |

(52) U.S. Cl.
CPC . *C08K 9/04* (2013.01); *B82Y 30/00* (2013.01); *C08J 5/005* (2013.01); *C08K 3/346* (2013.01); *C08J 2369/00* (2013.01)
USPC ........... 528/196; 528/199; 528/373; 524/262; 524/445

(58) Field of Classification Search
CPC ........... C08G 63/02; C08G 64/00; C08K 9/04
USPC ................... 528/196, 199, 373; 524/262, 445
See application file for complete search history.

(56) References Cited

U.S. PATENT DOCUMENTS

| | | | |
|---|---|---|---|
| 4,323,668 A | 4/1982 | Brunelle | |
| 5,412,061 A | 5/1995 | King, Jr. et al. | |
| 5,644,017 A * | 7/1997 | Drumright et al. | ........... 528/196 |
| 5,650,470 A | 7/1997 | McCloskey et al. | |
| 6,303,737 B1 | 10/2001 | Lemmon et al. | |
| 6,323,304 B1 | 11/2001 | Lemmon et al. | |
| 6,376,640 B1 | 4/2002 | Lemmon et al. | |
| 7,687,595 B2 | 3/2010 | Brunelle et al. | |
| 2003/0120025 A1 | 6/2003 | Brack et al. | |
| 2005/0137310 A1 | 6/2005 | Gupta et al. | |
| 2006/0116464 A1 * | 6/2006 | Brunelle et al. | .............. 524/444 |
| 2006/0135733 A1 | 6/2006 | Khouri et al. | |
| 2007/0100059 A1 | 5/2007 | Mullen | |
| 2009/0043069 A1 | 2/2009 | Brunelle et al. | |

OTHER PUBLICATIONS

U.S. Appl. No. 11/834,437, entitled "Activated Esters for Synthesis of Sulfonated Telechelic Polycarbonates," filed Aug. 6, 2007.
Yoon et al., "Polycarbonate Nanocomposites. Part 1. Effect of Organoclay Structure on Morphology and Properties", Polymer 44 (2003), pp. 5323-5339, Elsevier Ltd.
Yoon et al., "Polycarbonate Nanocomposites. Part 2. Degradation and Color Formation", Polymer 44 (2003), pp. 5341-5354, Elsevier Ltd.
Odian, "Principles of Polymerization", $3^{RD}$ Edition, Wiley-Interscience, New York, 1991, p. 427.
Ray, S. Sinha; Bousmina M.; Maazouz, A., "Morphology and Properties of Organoclay Modified Polycarbonate/Poly(methyl methacrylate) Blend," Polymer Engineering and Science, vol. 46, No. 8, Aug. 2006, pp. 1121-1129.
PCT International Search Report for International Application No. PCT/US2008/072222.
Lewis, Richard J., Sr. (2002). Hawley's Condensed Chemical Dictionary ($14^{th}$ Edition). John Wiley & Sons. Online version.

* cited by examiner

*Primary Examiner* — James J Seidleck
*Assistant Examiner* — Deve E Valdez
(74) *Attorney, Agent, or Firm* — Richard M. Klein; Fay Sharpe LLP

(57) ABSTRACT

Nanocomposites comprising a sulfonated telechelic polycarbonate and an organically modified clay are disclosed. The polycarbonate nanocomposites have improved physical and mechanical properties.

13 Claims, 4 Drawing Sheets
(2 of 4 Drawing Sheet(s) Filed in Color)

Polycarbonate Nanocomposite

Telechelic Sulfonated Polycarbonate

Telechelic Nanocomposite

POLYCARBONATE NANOCOMPOSITES

CROSS-REFERENCE TO RELATED APPLICATIONS

This application is a divisional of U.S. patent application Ser. No. 13/351,102, filed Jan. 16, 2012, now U.S. Pat. No. 8,487,066, which was a continuation of U.S. patent application Ser. No. 11/834,458, filed Aug. 6, 2007, now U.S. Pat. No. 8,173,761. The contents of those disclosures are hereby fully incorporated herein by reference.

The present disclosure is related to the patent application entitled "SULFONATED TELECHELIC POLYCARBONATES," concurrently filed as U.S. patent application Ser. No. 11/834,417, now U.S. Pat. No. 7,687,595. The present disclosure is also related to the patent application entitled "ACTIVATED ESTERS FOR SYNTHESIS OF SULFONATED POLYCARBONATE", concurrently filed as U.S. patent application Ser. No. 11/834,437. These disclosures are hereby fully incorporated herein by reference.

BACKGROUND

The present disclosure relates generally to polycarbonate nanocomposites prepared by polymerizing sulfonated telechelic polycarbonates in the presence of organically modified clays. Processes for producing such nanocomposites, as well as articles formed from the same, are also disclosed.

Nanocomposites are particle-filled polymers for which at least one of the dimensions of the dispersed phase is in the nanometer ($10^{-9}$ meter) or nanoscale range (typically from about 1 to about 20 nanometers). Nanocomposites often have superior physical and mechanical properties over their microcomposite counterparts, such as improved modulus, reduced gas permeability, flame retardance, and improved scratch resistance. Moreover, the nanoscale dispersion of the filler does not give rise to the brittleness and opacity typical of microcomposites or larger sized fillers.

Clay-based nanocomposites are obtained by the admixing of extraneous materials, such as polymers, with layered clay. Layered clay consists of metal silicates that are arranged in layered structures which are stacked in an orderly fashion. Admixing breaks the ordered layering of the clay into smaller particles, which are also known as platelets. The platelets have the improved properties described above. The clay is either blended with the polymer or blended with a monomer followed by in situ polymerization.

Polycarbonate nanocomposites have not been extensively researched compared to other types of nanocomposites. This may be because of the poor mechanical and color properties of the polycarbonate nanocomposites which have been obtained so far. D. R. Paul reported in *Polymer* 2003, vol. 44, pp. 5323-5339, that only a small fraction of the clay platelets are exfoliated while the main part of the polycarbonate/clay composite has an intercalated morphology. The reason for this low degree of dispersion may lie in the poor compatibility between the ionic clay surface and the non-polar polymer. As a result of this low degree of dispersion, the polycarbonate nanocomposite has inferior optical properties such as, for example, reduced transparency or increased haze.

D. R. Paul also reported in *Polymer* 2003, vol. 44, pp. 5341-5354, that the polycarbonate/clay composite is generally dark colored and that the weight average molecular weight (Mw) of the polycarbonate matrix consistently drops by 30% to 40% after extrusion from the melt process used to combine the materials. Typically carried out at about 300° C., the drop in Mw suggests that the polycarbonate matrix may not be thermally stable.

Furthermore, the color of the nanocomposite may depend on the type and purity of the clay and on the surfactant used to modify the clay. Ammonium surfactants, commonly used to modify clays during the manufacture of nanocomposites, cannot be used for polycarbonate nanocomposites prepared by melt methods since the thermal stability of the resulting clays is below normal processing temperatures for polycarbonate (280 to 320° C.). This leads to the formation of degradation products, providing mechanisms for the consistent decrease in Mw and strong discoloration of the product.

There remains a need for methods that reduce the degradation of the polymer matrix and increase the degree of dispersion of the clay. There is also a need for polycarbonate nanocomposites having improved thermo-mechanical properties and better color.

BRIEF DESCRIPTION

Disclosed herein, in various embodiments, are nanocomposites comprising a sulfonated telechelic polycarbonate and an organically modified clay.

In embodiments, the nanocomposite comprises at least one sulfonated telechelic polycarbonate and at least one organically modified clay; wherein the sulfonated telechelic polycarbonate comprises sulfonate end groups and structural units derived from at least one dihydroxy compound and at least one diaryl carbonate ester.

The nanocomposite may have a degree of dispersion of at least 32 angstroms. Additionally, the sulfonated telechelic polycarbonate of the nanocomposite may comprise at least 70 mole percent of sulfonate end groups, with respect to the total end groups present.

Furthermore, the organically modified clay may be present in the nanocomposite in the amount of from about 0.1 weight percent to about 10 weight percent, based on the total weight of the nanocomposite. The organically modified clay may be selected from the group consisting of montmorillonite, saponite, hectorite, mica, vermiculite, bentonite, nontronite, beidellite, volkonskoite, saponite, magadite, and kenyaite. In specific embodiments, the organically modified clay is montmorillonite or bentonite.

The organically modified clay may be modified with a functionalizing agent selected from the group consisting of polyalkyl ammonium salts, polyalkyl aminopyridinium salts, polyalkyl guanidinium salts, polyalkyl imidazolium salts, polyalkyl benzimidazolium salts, phosphonium salts, sulfonium salts, and mixtures thereof. In specific embodiments, the functionalizing agent is a polyalkyl imidazolium salt or a polyalkyl benzimidazolium salt.

In embodiments, articles are formed from a polycarbonate nanocomposite, the nanocomposite comprising at least one sulfonated telechelic polycarbonate and at least one organically modified clay; wherein the sulfonated telechelic polycarbonate comprises sulfonate end groups and structural units derived from at least one dihydroxy compound and at least one diaryl carbonate ester.

In other embodiments, methods for making a polycarbonate nanocomposite are disclosed. For example, the method may comprise:

reacting an initial mixture comprising at least one dihydroxy compound, at least one sulfobenzoic acid salt, and an organically modified clay to obtain an intermediate mixture;

adding at least one activated carbonate to the intermediate mixture; and reacting the intermediate mixture with the activated carbonate to obtain the polycarbonate nanocomposite.

The dihydroxy compound may have the structure of Formula (I):

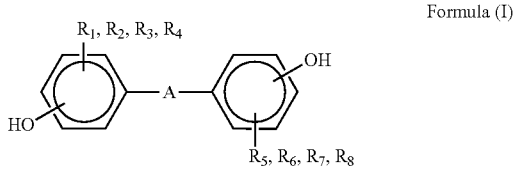

Formula (I)

wherein $R_1$ through $R_8$ are each independently selected from hydrogen, halogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic.

The sulfobenzoic acid salt may have the structure of Formula (II):

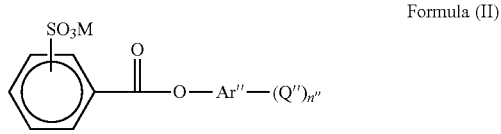

Formula (II)

wherein M is an alkali metal; Ar″ is an aromatic ring; Q″ is selected from alkoxycarbonyl, halogen, nitro, amide, sulfone, sulfoxide, imine, and cyano; and n″ is a whole number from zero up to the number of replaceable hydrogen groups on the aromatic ring Ar″.

The activated carbonate may have the structure of Formula (III):

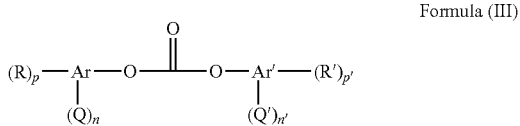

Formula (III)

wherein Q and Q′ are independently selected from alkoxycarbonyl, halogen, nitro, amide, sulfone, sulfoxide, imine, and cyano; Ar and Ar′ are independently aromatic rings; n and n′ are independently whole numbers from zero up to the number of replaceable hydrogen groups substituted on the aromatic rings Ar and Ar′, wherein (n+n′)≥1; p and p′ are integers; and R and R′ are independently selected from alkyl, substituted alkyl, cycloalkyl, alkoxy, aryl, alkylaryl having from 1 to 30 carbon atoms, cyano, nitro, halogen, and carboalkoxy.

The organically modified clay may be present in the amount of about 3 weight percent of the initial mixture. The organically modified clay may be formed in situ during the reaction of the initial mixture.

The initial mixture may be reacted at a temperature of from about 190° C. to about 230° C. The initial mixture may be reacted for a period of from about 60 minutes to about 120 minutes. The initial mixture may be reacted at a pressure of from about 0.5 bar to about 1.5 bar.

The pressure may be reduced to a range of from about 50 millibar to about 200 millibar after the activated carbonate is added.

The temperature may be increased to a temperature of from about 250° C. to about 280° C. while the intermediate mixture and the activated carbonate are reacted.

The pressure may be reduced to a pressure of from about 0.01 millibar to about 2 millibar while the intermediate mixture and the activated carbonate are reacted.

The intermediate mixture and the activated carbonate may be reacted for a period of from about 30 minutes to about 75 minutes.

In other embodiments, the nanocomposite may comprise at least one sulfonated telechelic polycarbonate and at least one organically modified clay; wherein the sulfonated telechelic polycarbonate comprises structural units derived from at least one dihydroxy compound and at least one diaryl carbonate ester; the polycarbonate comprises at least 70 mole percent of sulfonate end groups, with respect to the total end groups present; and the organically modified clay is present in the nanocomposite in the amount of from about 0.1 weight percent to about 10 weight percent, based on the total weight of the nanocomposite.

These and other non-limiting characteristics are more particularly described below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following is a brief description of the drawings, which are presented for the purposes of illustrating the exemplary embodiments disclosed herein and not for the purposes of limiting the same.

DETAILED DESCRIPTION

Figure 1:
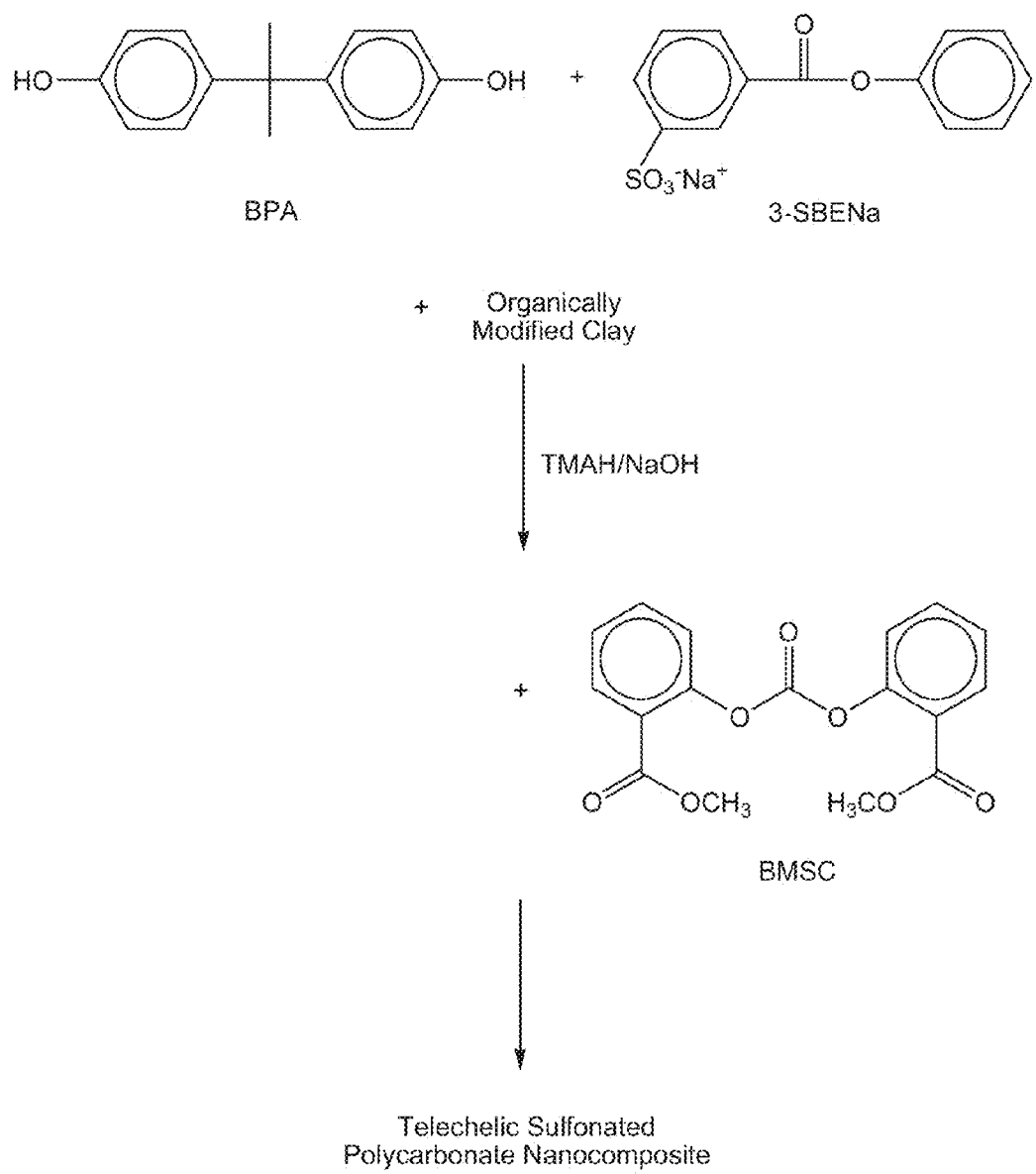
FIG. 1 is a diagram illustrating methods of forming the polycarbonate nanocomposites of the present disclosure.

The polycarbonate nanocomposites prepared herein can be used in display films, optical applications, automotives, medical and packaging applications where a combination of properties like transparency, hardness, extension-modulus, scratch resistance, flame retardance, good melt flow for moldability, and thermal expansion are required. Other uses and applications are also contemplated based upon the characteristics and properties of the polycarbonate nanocomposites produced.

The present disclosure may be understood more readily by reference to the following detailed description of preferred embodiments and the examples included therein. In the following specification and the claims which follow, reference will be made to a number of terms which shall be defined to have the following meanings.

The singular forms "a," "an," and "the" include plural referents unless the context clearly dictates otherwise. All ranges disclosed herein are inclusive of the recited endpoint and independently combinable (for example, the range of "from 2 grams to 10 grams" is inclusive of the endpoints, 2 grams and 10 grams, and all the intermediate values).

The modifier "about" used in connection with a quantity is inclusive of the stated value and has the meaning dictated by the context (for example, it includes at least the degree of error associated with the measurement of the particular quantity).

The term "integer" means a whole number which includes zero. For example, the expression "n is an integer from 0 to 4" means n may be any whole number from 0 to 4, including 0.

The term "dispersion" or "dispersed" refers to the distribution of the organically modified clay particles in the polymer matrix.

"Intercalated" or "intercalate" refers to a higher degree of interaction between the polymer matrix and the organically modified clay as compared to mere dispersion of the organically modified clay in the polymer matrix. When the polymer matrix is said to intercalate the organically modified clay, the organically modified clay exhibits an increase in the interlayer spacing between adjacent platelet surfaces as compared to the starting organically modified clay.

"Exfoliate" or "exfoliated" refers to platelets dispersed mostly in an individual state throughout a polymer matrix material. Herein, "exfoliated" is used to denote the highest degree of separation of platelet particles. "Exfoliation" refers to the process by which an exfoliate is formed from an intercalated or otherwise dispersed organically modified clay within a polymer matrix.

"Nanocomposite(s)" and "nanocomposite composition(s)" refer to a polymer or copolymer having dispersed therein a plurality of individual clay platelets obtained from a layered clay material, wherein the individual platelets have widths of from about 10 nanometers to about 3000 nanometers.

A "telechelic" polymer is a polymer whose end groups are functionalized with a suitable organic functional group. Telechelic polymers are well known in the literature. Their synthesis and applications have been discussed in, for e.g. Odian, G., *Principles of Polymerization*, 3rd edition, Wiley-Interscience, New York, 1991, pg 427.

The term "end group" refers to the functional group present on the ends of the telechelic polymer chain.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen or may be composed exclusively of carbon and hydrogen. Aliphatic groups may be substituted or unsubstituted. Exemplary aliphatic groups include, but are not limited to, methyl, ethyl, isopropyl, isobutyl, chloromethyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "aromatic" refers to an array of atoms having a valence of at least one and comprising at least one aromatic group. The array of atoms having a valence of at least one, comprising at least one aromatic group, may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl$_3$Ph-).

The term "cycloaliphatic" refers to an array of atoms which is cyclic but which is not aromatic. The cycloaliphatic group may include heteroatoms such as nitrogen, sulfur, selenium, silicon and oxygen, or may be composed exclusively of carbon and hydrogen. A cycloaliphatic group may comprise one or more noncyclic components. For example, a cyclohexylmethyl group (C$_6$H$_{11}$CH$_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The polycarbonate nanocomposite comprises an organically modified clay. The clay may be natural or synthetic. The clay may be a phyllosilicate. Exemplary clays include, but are not limited to, montmorillonite, saponite, hectorite, mica, vermiculite, bentonite, nontronite, beidellite, volkonskoite, saponite, magadite, and kenyaite. Suitable clays are available from various commercial sources such as Nanocor, Inc., Laviosa Chimica Mineraria, Southern Clay Products, Kunimine Industries, Ltd., and Elementis Specialties, Inc.

Other exemplary clays include: apophyllite, bannisterite, carletonite, cavansite, chrysocolla, delhayelite, elpidite, fedorite, linfurnaceite, gonyerite, gyrolite, leucosphenite, minehillite, nordite, pentagonite, petalite, prehnite, rhodesite, sanbornite; chlorite clays such as baileychlore, chamosite, general categories of chlorite mineral, cookeite, nimite, pennantite, penninite and sudoite; glauconite, illite, kaolinite, palygorskite, pyrophyllite, sauconite, talc, lepidolite, muscovite, paragonite, phlogopite, zinnwaldite; antigorite [(Mg, Fe)$_3$Si$_2$O$_5$(OH)$_4$, having a monoclinic structure]; clinochrysotile [Mg$_3$Si$_2$O$_5$(OH)$_4$, having a monoclinic structure]; lizardite [Mg$_3$Si$_2$O$_5$(OH)$_4$, having either a trigonal or a hexagonal structure); orthochrysotile [Mg$_3$Si$_2$O$_5$(OH)$_4$, having an orthorhombic structure]; and parachrysotile [(Mg, Fe)$_3$Si$_2$O$_5$(OH)$_4$, having an orthorhombic structure].

In specific embodiments, the clay is a smectite clay mineral, particularly bentonite or montmorillonite.

Untreated clays generally have sheet-like structures, due in part to the presence of rings of tetrahedrons linked by oxygen atoms and shared with other rings in a two dimensional plane. Layers of cations, such as sodium ions, connect the sheet-like structures. These layers of cations that connect the sheet-like structures are hereinafter referred to as interlayers. The cations are weakly bonded and are surrounded by neutral molecules, such as water molecules. The distance between the layers of sheet-like structures is referred to as the "d-spacing." The silicon to oxygen ratio in the untreated clay is generally from about 1:1 to about 2.5:1. The cohesive energy between interlayers is relatively strong, and unless treated suitably, will not allow the entry of organic polymer molecules between the layers of the untreated clay.

The clay may be converted into an organically modified clay by treating the clay with at least one functionalizing agent. This facilitates separation of the sheet-like structures into individual platelet particles. Separating the platelet particles prior to incorporation into the polycarbonate also improves the polycarbonate/platelet interface. Any treatment that achieves the above goals may be used. Known clay treatments used to modify the clay for the purpose of improving dispersion of clay materials may be used. This conversion or functionalization may be conducted prior to, or during, mixing the clay material with the polycarbonate.

Suitable functionalizing agents can increase the d-spacing so as to facilitate incorporation of polymer molecules. The functionalizing agent also serves to compatibilize the interlayers of the untreated clay with polymer molecules to form a polymer nanocomposite. The functionalization can be carried out by using functionalizing agents such as imidazolium, phosphonium, ammonium and phthalimide compounds, by employing methods generally known to a person skilled in the art. Typically, the functionalization is achieved by a cation-exchange reaction between the untreated clay and the functionalizing agent. Generally, the functionalizing agent is used in an amount that is twice the experimentally measured exchange capacity of the untreated clay. The functionalizing agent is dissolved in a solvent, such as an alcohol-water mixture (e.g., 50:50 v/v) followed by the addition of the untreated clay. The mixture thus formed is heated for a sufficient time to obtain an organically modified clay.

Suitable functionalizing agents include, but are not limited to, polyalkyl ammonium salts, polyalkyl aminopyridinium salts, polyalkyl guanidinium salts, polyalkyl imidazolium salts, polyalkyl benzimidazolium salts, phosphonium salts, sulfonium salts, and mixtures thereof. Exemplary polyalkyl ammonium salts include tetramethyl ammonium, hexyl ammonium, bis(2-hydroxyethyl)dimethyl ammonium, octadecyl trimethyl ammonium, bis(2-hydroxyethyl)octadecyl methyl ammonium, octadecyl benzyl dimethyl ammonium, and the like. Exemplary polyalkyl aminopyridinium salts include p-dimethylamino N-methyl pyridinium salts, o-dimethylaminopyridinium salts, and the like. Exemplary polyalkyl guanidinium salts include hexaalkyl guanidinium salts and the like. Exemplary polyalkyl imidazolium salts include N,N'-dioctadecyl imidazolium, N,N'-dihexadecyl imiazolium, 1,2 dimethyl-3-hexadecyl imidazolium, 1-decyl-2,3-dimethyl imidazolium, 1-butyl-2,3-dimethyl imidazolium, 1,2-dimethyl-3-propyl imidazolium, 1,2-dimethyl-3-hexadecyl imidazolium, N,N'-dioctadecylbenzimidazolium, N,N'-dihexadecylbenzimidazolium, and the like. Exemplary phosphonium salts include triphenyldodecyl phosphonium bromide, tributylhexadecyl phosphonium bromide, tetraphenyl phosphonium bromide, tetraoctylphosphonium bromide, and the like.

Polyalkyl imidazolium and polyalkyl benzimidazolium salts bearing 1 or 2 alkyl chains are particularly preferred functionalizing agents because they produce clays with very large d-spacing (over 30 angstroms) and with thermal stability over 300° C. In some embodiments, the clays have a thermal stability exceeding 350° C.

The polycarbonate nanocomposite further comprises a sulfonated telechelic polycarbonate. As used herein, "polycarbonate" refers to an oligomer or polymer comprising residues of one or more dihydroxy compounds joined by carbonate linkages; it also encompasses poly(carbonate-co-ester) oligomers and polymers. Generally speaking, the sulfonated telechelic polycarbonate is the product of the reaction of three components: a dihydroxy compound, a sulfobenzoic acid salt, and an activated carbonate.

The dihydroxy compound has the structure of Formula (I):

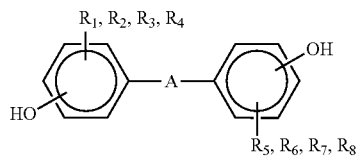

Formula (I)

wherein $R_1$ through $R_8$ are each independently selected from hydrogen, halogen, nitro, cyano, $C_1$-$C_{20}$ alkyl, $C_4$-$C_{20}$ cycloalkyl, and $C_6$-$C_{20}$ aryl; and A is selected from a bond, —O—, —S—, $C_1$-$C_{12}$ alkyl, $C_6$-$C_{20}$ aromatic, and $C_6$-$C_{20}$ cycloaliphatic.

In specific embodiments, the dihydroxy compound of Formula (I) is 2,2-bis(4-hydroxyphenyl)propane (i.e. bisphenol-A or BPA). Other illustrative compounds of Formula (I) include:
2,2-bis(3-bromo-4-hydroxyphenyl)propane;
2,2-bis(4-hydroxy-3-methylphenyl)propane;
2,2-bis(4-hydroxy-3-isopropylphenyl)propane;
2,2-bis(3-t-butyl-4-hydroxyphenyl)propane;
2,2-bis(3-phenyl-4-hydroxyphenyl)propane;
2,2-bis(3,5-dichloro-4-hydroxyphenyl)propane;
1,1-bis(4-hydroxyphenyl)cyclohexane;
1,1-bis(3-chloro-4-hydroxyphenyl)-3,3,5-trimethylcyclohexane;
4,4'dihydroxy-1,1-biphenyl;
4,4'-dihydroxy-3,3'-dimethyl-1,1-biphenyl;
4,4'-dihydroxy-3,3'-dioctyl-1,1-biphenyl;
4,4'-dihydroxydiphenylether;
4,4'-dihydroxydiphenylthioether; and
1,3-bis(2-(4-hydroxyphenyl)-2-propyl)benzene.

The sulfobenzoic acid salt has the structure of Formula (II):

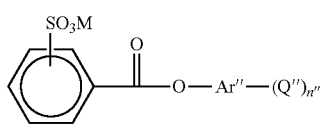

Formula (II)

wherein M is an alkali metal; Ar" is an aromatic ring; Q" is selected from alkoxycarbonyl, halogen, nitro, amide, sulfone, sulfoxide, imine, and cyano; and n" is a whole number from zero up to the number of replaceable hydrogen groups on the aromatic ring Ar". In specific embodiments, the sulfobenzoic acid salt is the 3-sulfobenzoic acid salt (i.e. the sulfonate group is in the meta position to the acid group). In other specific embodiments, M is sodium, Ar" is phenyl, and n" is zero. In this case, the sulfobenzoic acid salt may also be known as the phenyl ester of the sulfobenzoic acid salt. In other specific embodiments, Ar" is phenyl, n" is 1, and Q" is methoxycarbonyl in an ortho position to the ester bond. In this case, the sulfobenzoic acid salt may also be known as the methyl salicyl ester of the sulfobenzoic acid salt.

As used herein, the term "activated carbonate" is defined as a diaryl carbonate which is more reactive than diphenyl carbonate toward transesterification reactions. Such activated carbonates have the structure of Formula (III):

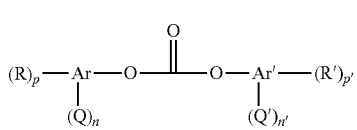

Formula (III)

wherein Q and Q' are independently activating groups; Ar and Ar' are independently aromatic rings; n and n' are independently whole numbers from zero up to the number of replaceable hydrogen groups substituted on the aromatic rings Ar and Ar', wherein (n+n')≥1; p and p' are integers; and R and R' are independently selected from alkyl, substituted alkyl, cycloalkyl, alkoxy, aryl, alkylaryl having from 1 to 30 carbon atoms, cyano, nitro, halogen, and carboalkoxy. The number of R groups, p, is an integer and can be zero up to the number of replaceable hydrogen groups on the aromatic ring Ar minus the number n. The number of R' groups, p', is an integer and can be zero up to the number of replaceable hydrogen groups on the aromatic ring Ar' minus the number n'. The number and type of the R and R' substituents on the aromatic rings Ar and Ar' are not limited unless they deactivate the carbonate and lead to a carbonate which is less reactive than diphenyl carbonate. Typically, the R and R' substituents are located in the para, ortho, or a combination of the two positions.

Non-limiting examples of activating groups Q and Q' are: alkoxycarbonyl groups, halogens, nitro groups, amide groups, sulfone groups, sulfoxide groups, imine groups, and cyano groups.

Specific and non-limiting examples of activated carbonates include:
bis(o-methoxycarbonylphenyl)carbonate;
bis(o-chlorophenyl)carbonate;
bis(o-nitrophenyl)carbonate;
bis(o-acetylphenyl)carbonate;
bis(o-phenylketonephenyl)carbonate;
bis(o-formylphenyl)carbonate; and
bis(o-cyanophenyl)carbonate.
Unsymmetrical combinations of these structures, where the substitution number and type on Ar and Ar' are different, may also be used.

A preferred structure for an activated carbonate is an ester-substituted diarylcarbonate having the structure of Formula (IV):

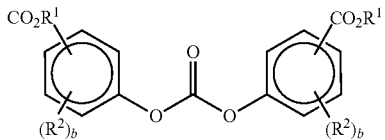

Formula (IV)

wherein $R^1$ is independently a $C_1$-$C_{20}$ alkyl radical, $C_4$-$C_{20}$ cycloalkyl radical, or $C_4$-$C_{20}$ aromatic radical; $R^2$ is independently a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer from zero to 4. Preferably, at least one of the substituents $CO_2R^1$ is attached in an ortho position relative to the carbonate group.

Examples of preferred ester-substituted diarylcarbonates include, but are not limited to, bis(methylsalicyl)carbonate (BMSC) (CAS Registry No. 82091-12-1), bis(ethyl salicyl) carbonate, bis(propyl salicyl) carbonate, bis(butylsalicyl) carbonate, bis(benzyl salicyl)carbonate, bis(methyl 4-chlorosalicyl)carbonate and the like. Typically bis(methylsalicyl) carbonate is preferred for use in melt polycarbonate synthesis due to its preparation from less expensive raw materials, lower molecular weight and higher vapor pressure.

One method for determining whether a certain diarylcarbonate is activated or is not activated is to carry out a model transesterification reaction between the certain diarylcarbonate with a phenol such as para-cumyl phenol. This phenol is preferred because it possesses only one reactive site, possesses a low volatility, and possesses a similar reactivity to bisphenol-A. The model transesterification reaction is carried out at temperatures above the melting points of the certain diarylcarbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diarylcarbonate. A preferred reaction temperature is 200° C. The choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-know detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diarylcarbonate which possesses an equilibrium constant of greater than 1 is considered to possess a more favorable equilibrium than diphenyl carbonate and is an activated carbonate, whereas a diaryl carbonate which possesses an equilibrium constant of 1 or less is considered to possess the same or a less favorable equilibrium than diphenyl carbonate and is considered to be not activated. It is generally preferred to employ an activated carbonate with very high reactivity compared to diphenyl carbonate when conducting transesterification reactions. Preferred are activated carbonates with an equilibrium constant at least 10 times greater than that of diphenyl carbonate. Use of activated carbonate allows polymerization in a shorter time and at lower temperatures.

Some non-limiting examples of non-activating groups which, when present in an ortho position relative to the carbonate group, would not be expected to result in activated carbonates are alkyl and cycloalkyl. Some specific and non-limiting examples of non-activated carbonates are bis(o-methylphenyl)carbonate, bis(p-cumylphenyl)carbonate, and bis (p-(1,1,3,3-tetramethyl)butylphenyl)carbonate.
Unsymmetrical combinations of these structures are also expected to result in non-activated carbonates.

To form the polycarbonate nanocomposite, an initial reaction mixture comprising a dihydroxy compound, a sulfobenzoic acid salt, and an organically modified clay is reacted to obtain an intermediate mixture. The intermediate mixture is then reacted with an activated carbonate to obtain the polycarbonate nanocomposite.

The dihydroxy compound and sulfobenzoic acid salt are first reacted together (i.e. separate from the activated carbonate) to improve the solubility of the salt. In addition, the reaction rate of the activated carbonate with the dihydroxy compound is consistently faster than the reaction rate of the sulfobenzoic acid salt with the dihydroxy compound. Thus, in one-pot reactions of the three compounds, the sulfobenzoic acid salt is unable to react with the dihydroxy compound. As the amount of unreacted dihydroxy compound decreases, the reaction rate with the sulfobenzoic acid salt also decreases.

The organically modified clay can be made in at least two ways. Untreated clay may be separately modified with a functionalizing agent and then added to the initial reaction mixture. Alternatively, untreated clay and functionalizing agent may be separately added to the initial reaction mixture and the organically modified clay can be formed in situ during the reaction to form the intermediate mixture. The organically modified clay may be present in the amount of from about 0.1 to about 10 weight percent of the initial reaction mixture. In specific embodiments, the organically modified clay is about 3 weight percent of the initial reaction mixture.

The molar ratio of dihydroxy compound to sulfobenzoic acid salt can be from about 99.9:0.1 to about 90:10. In specific embodiments, the molar ratio is about 97:3. This ensures a sufficient amount of dihydroxy compound is available to react with the sulfobenzoic acid salt and also ensures that the sulfobenzoic acid salt becomes a terminal end group.

The initial reaction mixture may further comprise a catalyst. The catalyst may be a one-component or multi-component catalyst, such as a catalyst system. In specific embodiments, the catalyst comprises a system of tetramethyl ammonium hydroxide (TMAH) and sodium hydroxide (NaOH). The weight ratio of TMAH to NaOH can be from about 100 to about 500 and, in specific embodiments, is about 263. Other suitable catalysts include for use in polycarbonate synthesis include those described in U.S. Pat. Nos. 6,376,640; 6,303,737; 6,323,304; 5,650,470; and 5,412,061.

The initial reaction mixture may be reacted at a temperature of from about 190° C. to about 230° C. It may be reacted for a period of from about 60 minutes to about 120 minutes. It may also be reacted together at a pressure of from about 0.5 bar to about 1.5 bar. In specific embodiments, the pressure is atmospheric pressure (1 atm=~1.013 bar); however, a slight overpressure can be used to decrease the loss of the dihydroxy compound due to evaporation. Generally, the temperature is held constant during this reaction. In some specific embodiments, the initial reaction mixture is reacted for 90 minutes at 210° C. at atmospheric pressure. An intermediate mixture results from this first reaction.

The pressure may be reduced after the activated carbonate is added. In specific embodiments, the pressure is reduced to a range of from about 50 millibar to about 200 millibar after the activated carbonate is added.

The intermediate mixture and the activated carbonate may then be reacted for a period of from about 30 minutes to about 120 minutes.

The temperature and pressure may be varied while the intermediate mixture and the activated carbonate are reacted. The pressure may be further reduced to a pressure of from about 0.01 millibar to about 2 millibar during the reaction. This pressure reduction can be done in stages. The temperature may be increased to a temperature of from about 250° C. to about 280° C. while the intermediate mixture and the activated carbonate are reacted. The temperature and pressure may also be varied and held at certain levels for certain periods of time during this reaction as well.

In specific embodiments, after the activated carbonate is added to the mixture, the pressure is reduced to 130 millibar and the intermediate mixture and the activated carbonate are reacted for a period of from about 5 minutes to about 30 minutes. The temperature is then increased to 260° C. while the pressure is further reduced to full vacuum (or as close as possible) and the reaction is allowed to proceed for an additional 30 to 45 minutes. The pressure is slowly reduced so that the reaction does not boil too quickly.

A pale yellow and almost transparent nanocomposite is obtained from the processes of the present disclosure. The polycarbonates synthesized using such methods comprise at least 50 mole percent of sulfonate end groups, with respect to the total end groups present, or at least 70 mole percent. In addition, such polycarbonates do not include sulfonate groups in the backbone of the polycarbonate itself. The addition of ionic groups to the polycarbonate increases the interaction between the clay surface and the polycarbonate, producing better dispersion. The polycarbonate nanocomposites of the present disclosure also have good color and good degree of dispersion.

The polycarbonate nanocomposite composition, comprising telechelic sulfonated polycarbonate and organically modified clay, generally contains the modified clay in the range of from about 0.1 weight percent to about 10 weight percent, based on the total weight of the nanocomposite. In more specific embodiments, the modified clay is present in the range of from about 1 weight percent to about 7 weight percent. In further specific embodiments, the modified clay is present in the range of from about 2 weight percent to about 5 weight percent.

FIG. 1 is a diagram illustrating the methods of the present disclosure. In this diagram, exemplary compounds BPA, phenyl 3-sulfobenzoate sodium salt (3-SBENa), and BMSC are used. BPA, 3-SBENa, and an organically modified clay are first reacted together, along with catalyst system TMAH and NaOH, to form an intermediate mixture. BMSC is then added and reacted with the intermediate mixture to form a telechelic sulfonated polycarbonate nanocomposite.

The methods described herein are also applicable to polycarbonates and copolymers prepared from mixtures and/or combinations of dihydroxy compounds, sulfobenzoic acid salts, activated carbonates, and stable clays. The lower reaction temperatures and shorter polymerization times consistently decrease the degradation reactions observed in other methods.

The polycarbonate/clay nanocomposite compositions may further comprise one or more additives. The additive(s) may be present in quantities of up to about 80% by weight, and more preferably in quantities of from 0.00001 to about 60% by weight, based on the weight of the composition comprising the additive(s). These additives include such materials as thermal stabilizers, antioxidants, UV stabilizers, plasticizers, visual effect enhancers, extenders, antistatic agents, catalyst quenchers, mold releasing agents, fire retardants, blowing agents, impact modifiers, processing aids, other oligomeric species, and other polymeric species. The different additives that can be incorporated into the polycarbonate/clay nanocomposites are typically those that are commonly used in resin compounding and are known to those skilled in the art.

The polycarbonate nanocomposites of the present disclosure may be formed into articles by conventional plastic processing techniques. Molded articles may be made by compression molding, blow molding, injection molding or such molding techniques known to those skilled in the art. Articles prepared from the nanocomposites include, but are not limited to, film, sheet, pipes, tubes, profiles, molded articles, performs, stretch blow molded films and containers, injection blow molded containers, extrusion blow molded films and containers, thermoformed articles and the like. Articles prepared from the compositions of the present disclosure may be used in applications that require materials with low glass transition temperature and high heat resistance such as automotive applications. In one embodiment, an article comprises at least one nanocomposite polymer composition, wherein said composition comprises at least one sulfonated telechelic polycarbonate, and at least one organically modified clay, wherein said telechelic polycarbonate comprises sulfonate end groups and structural units derived from at least one diol and at least one carbonate linkage, wherein said article is an automotive part. Automotive parts are exemplified by body panels, quarter panels, rocker panels, trim, fenders, doors, decklids, trunklids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards.

The following examples are provided to illustrate the polycarbonate nanocomposites, articles, and methods of the present disclosure. The examples are merely illustrative and are not intended to limit the disclosure to the materials, conditions, or process parameters set forth therein.

EXAMPLES

Example 1

A round bottom wide-neck glass reactor (250 ml capacity) was charged with bisphenol-A (BPA) (25.30 grams; 110.8 millimoles), phenyl 3-sulfobenzoate sodium salt (3-SBENa) (1.00 grams; 3.32 millimoles), organically modified clay (0.846 grams of a sodium montmorillonite with a Cation Exchange Capacity of 128 milliequivalents/100 grams exchanged with N,N'-dioctadecyl benzimidazolium salt with a d-spacing of 32 angstroms) and the catalyst (a mixture of $2.22 \times 10^{-2}$ millimoles tetramethylammonium hydroxide (TMAH) and $8.43 \times 10^{-5}$ millimoles of NaOH). The clay was 3 weight percent of this initial reaction mixture, based on the weight of the BPA, 3-SBENa, and clay.

The reactor was closed with a three-neck flat flange lid equipped with a mechanical stirrer and a torque meter. The system was then connected to a water cooled condenser and immersed in a thermostatic oil-bath at 210° C. and the stirrer switched on at 100 rpm after complete melting of the reactants. After 90 minutes, BMSC (36.95 grams; 111.9 millimoles) was then carefully added and dynamic vacuum was applied at 130 millibar for 10 minutes. The temperature was then increased to 260° C. over 10 minutes and the pressure decreased to 0.2 millibars. The reaction melt was very viscous after 10 minutes from the application of dynamic vacuum and the stirring was very difficult and slow in the last part of the polymerization. The very viscous pale yellow and almost transparent melt was discharged from the reactor and analyzed by $^1$H-NMR, GPC, DSC and TGA.

The polymerization was also repeated with other organically modified clays and without the addition of ionic groups.

Analysis

Figure 2:
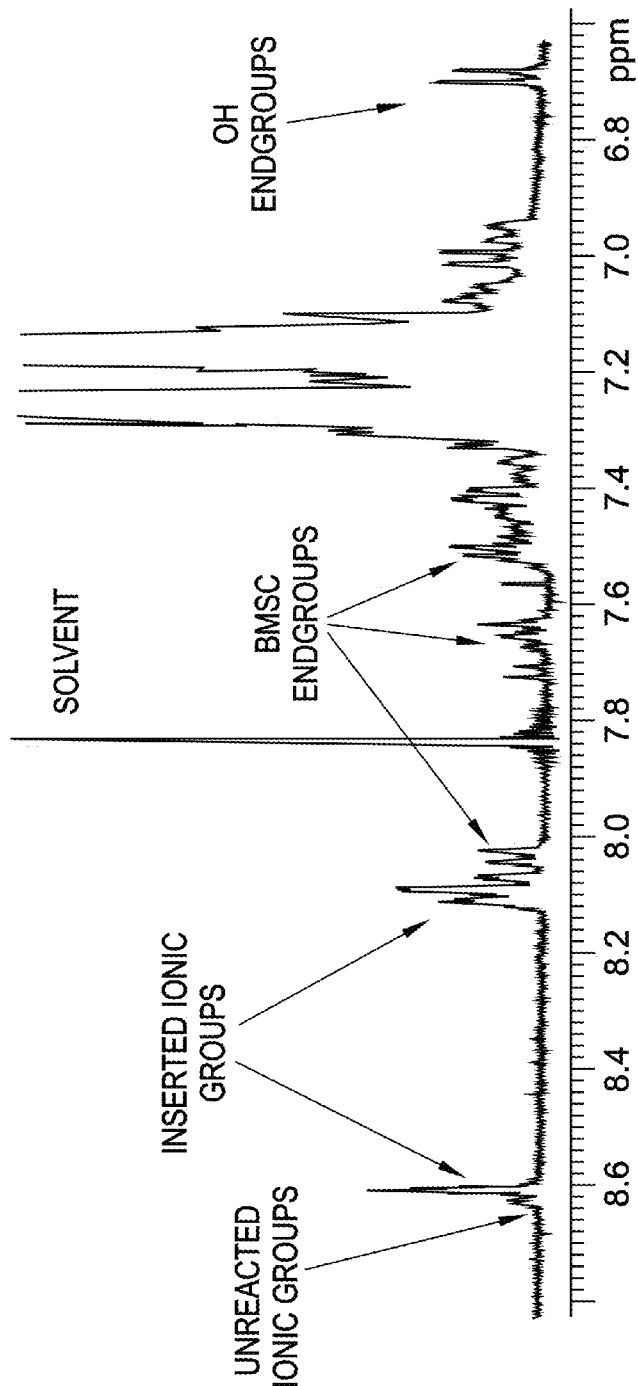
FIG. 2 is an $^1$H-NMR spectrum of a polycarbonate nanocomposite.

FIG. 2 is the $^1$H-NMR analysis of the polycarbonate nanocomposite. No consistent degradation reaction takes place. No Fries by-products are detectable by NMR. The endgroups are mainly ionic. However, both hydroxyl (—OH) and BMSC end groups are still present, not just BMSC end groups. This may be due to the fact that the melt viscosity was very high and the removal of the methyl salicylate from the BMSC was more difficult because of the increased barrier properties.

Table 1 shows various properties of three different compositions: the telechelic sulfonated polycarbonate nanocomposite, the telechelic sulfonated polycarbonate alone (i.e. without clay added), and a BPA polycarbonate nanocomposite (i.e. without sulfonated end groups).

TABLE 1

| Composition | Clay (% w/w) | Ionic Content (%) | $M_w$ | Tg (° C.) | TGA |
|---|---|---|---|---|---|
| Telechelic polycarbonate | 0 | 3 | 44,000 | 147 | 409 |
| Polycarbonate nanocomposite | 3 | 0 | 32,800 | 142 | 445 |
| Telechelic nanocomposite | 3 | 3 | 31,400 | 145 | 449 |

The two nanocomposites had consistently higher thermal stability compared to the telechelic sulfonated polycarbonate, by about 40° C. as seen from the TGA. The telechelic nanocomposite, having ionic groups, was slightly more stable.

No significant differences were observed in DSC analyses. The glass transition temperatures (Tg) were all in a narrow range and no evidence of crystallinity was found in any of the samples.

Figure 3:
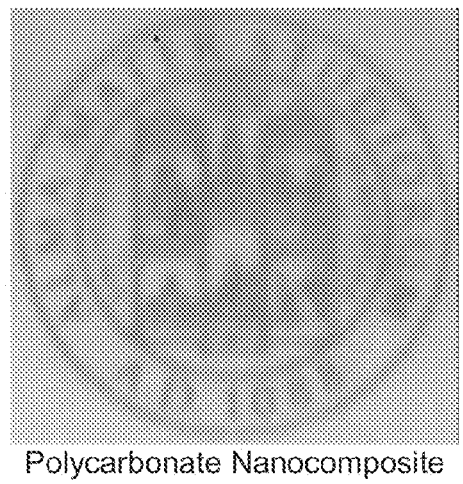
FIG. 3 is images of three compositions for comparative purposes.
Figure 3:
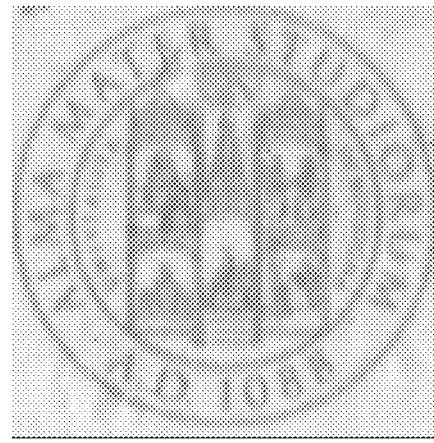
Figure 3:
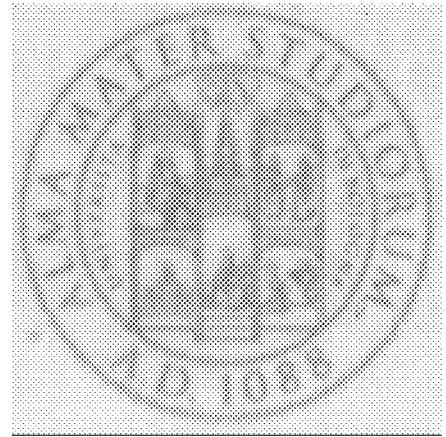

FIG. 3 shows images of thin films (1 millimeter thick) formed from the three compositions. Improvements in transmittance, clarity, and color can be seen for the telechelic nanocomposite compared to the polycarbonate nanocomposite. The telechelic nanocomposite is brighter than the polycarbonate nanocomposite, indicating improved transmittance. The image of the seal appears more focused for the telechelic nanocomposite, indicating improved clarity (i.e. decreased haze). As particle size decreases, the amount of light they scatter decreases. Thus, improved clarity shows a better dispersion of the clay, i.e. it is exfoliated. The polycarbonate nanocomposite has a brownish color, whereas the telechelic nanocomposite is clear, indicating improved color.

Figure 4:
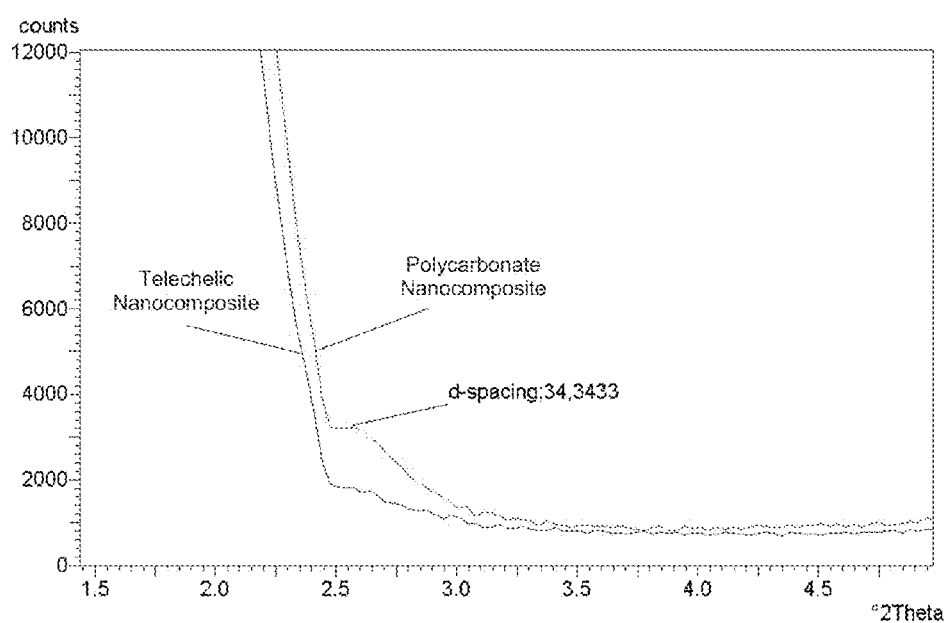
FIG. 4 is an X-ray diffraction diagram of two nanocomposites for comparative purposes.

FIG. 4 is an X-ray diffraction diagram of the telechelic nanocomposite and the polycarbonate nanocomposite. The polycarbonate nanocomposite has a plateau corresponding to a d-spacing of 34 angstroms, as indicated by the peak. This reflects the distance between layers in the clay and indicates intercalation. In contrast, the telechelic nanocomposite does not have this plateau at 34 angstroms. This indicates that the clay layers are no longer stacked, or in other words that the clay is exfoliated.

The polycarbonate nanocomposites of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for making a polycarbonate nanocomposite, comprising:
reacting an initial mixture comprising at least one dihydroxy compound, at least one sulfobenzoic acid salt, and an organically modified clay to obtain an intermediate mixture;
adding at least one activated carbonate to the intermediate mixture; and
reacting the intermediate mixture with the activated carbonate to obtain the polycarbonate nanocomposite.

2. The method of claim 1, wherein the dihydroxy compound has the structure of Formula (I):

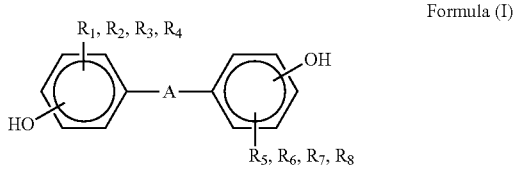

Formula (I)

wherein $R_1$ through $R_8$ are each independently selected from hydrogen, halogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic;
the sulfobenzoic acid salt has the structure of Formula (II):

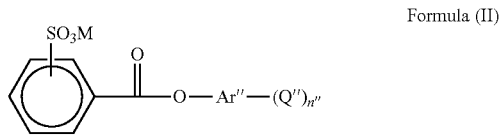

Formula (II)

wherein M is an alkali metal; Ar" is an aromatic ring; Q" is selected from alkoxycarbonyl, halogen, nitro, amide, sulfone, sulfoxide, imine, and cyano; and n" is a whole number from zero up to the number of replaceable hydrogen groups on the aromatic ring Ar"; and
the activated carbonate has the structure of Formula (III):

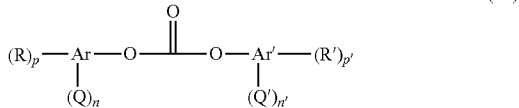

Formula (III)

wherein Q and Q' are independently selected from alkoxycarbonyl, halogen, nitro, amide, sulfone, sulfoxide, imine, and cyano; Ar and Ar' are independently aromatic rings; n and n' are independently whole numbers from zero up to the number of replaceable hydrogen groups substituted on the aromatic rings Ar and Ar', wherein (n+n')≥1; p and p' are integers; and R and R' are independently selected from alkyl, substituted alkyl, cycloalkyl, alkoxy, aryl, alkylaryl having from 1 to 30 carbon atoms, cyano, nitro, halogen, and carboalkoxy.

3. The method of claim 1, wherein the organically modified clay is formed in situ during the reaction of the initial mixture.

4. The method of claim 1, wherein the initial mixture is reacted at a temperature of from about 190° C. to about 230° C.

5. The method of claim 1, wherein the initial mixture is reacted for a period of from about 60 minutes to about 120 minutes.

6. The method of claim 1, wherein the initial mixture is reacted at a pressure of from about 0.5 bar to about 1.5 bar.

7. The method of claim 1, wherein the pressure is reduced to a range of from about 50 millibar to about 200 millibar after the activated carbonate is added.

8. The method of claim 1, wherein the temperature is increased to a temperature of from about 250° C. to about 280° C. while the intermediate mixture and the activated carbonate are reacted.

9. The method of claim 1, wherein the pressure is reduced to a pressure of from about 0.01 millibar to about 2 millibar while the intermediate mixture and the activated carbonate are reacted.

10. The method of claim 1, wherein the intermediate mixture and the activated carbonate are reacted for a period of from about 30 minutes to about 75 minutes.

11. The method of claim 2, wherein Ar" is phenyl and n" is zero.

12. The method of claim 1, wherein the resulting nanocomposite comprises:
at least one sulfonated telechelic polycarbonate; and
at least one organically modified clay;
wherein the sulfonated telechelic polycarbonate comprises sulfonate end groups and structural units derived from at least one dihydroxy compound and at least one diaryl carbonate ester; and
wherein the sulfonated telechelic polycarbonate comprises at least 70 mole percent of sulfonate end groups, with respect to the total end groups present.

13. The method of claim 12, wherein the resulting nanocomposite has a weight average molecular weight of greater than 30,000 as measured by gel permeation chromatography versus polystyrene standards.

* * * * *